United States Patent [19]

Yamamoto

[11] Patent Number: 5,477,232
[45] Date of Patent: Dec. 19, 1995

[54] ANTENNA APPARATUS HAVING INDIVIDUAL TRANSMITTING AND RECEIVING ANTENNA ELEMENTS FOR DIFFERENT FREQUENCIES

[75] Inventor: Naonobu Yamamoto, Tokyo, Japan

[73] Assignee: NEC Corporation, Japan

[21] Appl. No.: 269,053

[22] Filed: Jun. 29, 1994

[30] Foreign Application Priority Data

Jun. 30, 1993 [JP] Japan ................................. 5-161054
Jun. 30, 1993 [JP] Japan ................................. 5-183176

[51] Int. Cl.$^6$ ....................................................... H01Q 1/32
[52] U.S. Cl. ........................... 343/713; 343/895; 343/894
[58] Field of Search ..................................... 343/713, 715, 343/757, 760, 895, 894; 455/129, 73, 345; H01Q 1/32

[56] References Cited

U.S. PATENT DOCUMENTS

| | | | |
|---|---|---|---|
| 4,176,356 | 11/1979 | Foster et al. | 343/100 |
| 4,379,298 | 4/1983 | Vincent et al. | 343/895 |
| 4,736,461 | 4/1988 | Kawasaki et al. | 455/343 |
| 4,916,456 | 4/1990 | Shyu | 343/713 |
| 4,992,799 | 2/1991 | Garay | 343/702 |
| 5,146,235 | 9/1992 | Frese | 343/895 |
| 5,204,970 | 4/1993 | Stengel et al. | 455/69 |
| 5,225,845 | 7/1993 | Blaese | 343/713 |
| 5,274,393 | 12/1993 | Scott | 343/894 |
| 5,283,589 | 2/1994 | Blevins | 343/713 |

FOREIGN PATENT DOCUMENTS 540125   5/1993  European Pat. Off. .
3008684  9/1980  Germany .

OTHER PUBLICATIONS

H. Sarada, "Multi-Beam Mobile Satellite Communication System", Mobile-Satcom '89, International Forum on Mobile Sattelite Communications, pp. 67–78, May 1989.

*Primary Examiner*—Donald T. Hajec
*Assistant Examiner*—Tan Ho
*Attorney, Agent, or Firm*—Ostrolenk, Faber, Gerb & Soffen

[57] ABSTRACT

In an antenna apparatus provided at a mobile station for communication with a satellite, a transmitting antenna element for transmitting a signal having a certain transmitting frequency to the satellite is individually provided separate from a receiving antenna element for receiving a signal having a certain receiving frequency from the satellite, the transmitting frequency and the receiving frequency being different from each other.

7 Claims, 11 Drawing Sheets

| SCALE | 1 | 2 | 3 | ... | i | ... | |
|---|---|---|---|---|---|---|---|
| α | $\theta_1$ | $\theta_2$ | $\theta_3$ | ... | $\theta_i$ | ... | TX=1.660GHz |
| β | $\theta_1$ | $\theta_2$ | $\theta_3$ | ... | $\theta_i$ | ... | RX=1.559GHz |

5,477,232

ANTENNA APPARATUS HAVING INDIVIDUAL TRANSMITTING AND RECEIVING ANTENNA ELEMENTS FOR DIFFERENT FREQUENCIES

BACKGROUND OF THE INVENTION

1. Field of the Invention

The present invention relates to a mobile satellite communication system, and more particularly, to an antenna apparatus provided at a mobile station for communication with a satellite.

2. Description of the Related Art

In a mobile satellite communication system such as MSAT, where communication is carried out between a mobile station and a satellite, a prior art antenna apparatus provided at the mobile station is comprised of a single antenna element, to thereby obtain a compact configuration. Such a single antenna element is a helical-type mast antenna whose directivity can be adjusted by changing the length or pitch of a helical conductor element. Therefore, when the mobile station moves thus changing its location, a beam direction, i.e., a directivity of the antenna element always must face the satellite.

On the other hand, generally, in a mobile satellite communication system, a transmitting frequency (TX) of a signal transmitted from the mobile station is different from a receiving frequency (RX) of a signal received by the mobile station, to thereby avoid radio interference. For example, the transmitting frequency TX is 1.660 GHz, and the receiving frequency RX is 1.559 GHz.

In the above-mentioned prior art antenna apparatus, however, the directivity of the antenna element which is, in this case, the elevation angle of the antenna element, is dependent upon the frequency thereof. Therefore, when the directivity of the antenna element in relation to the satellite is optimum with respect to the receiving frequency, the directivity of the antenna element in relation to the satellite is not optimum with respect to the transmitting frequency. Conversely, when the directivity of the antenna element in relation to the satellite is optimum with respect to the transmitting frequency, the directivity of the antenna element to the satellite is not optimum with respect to the receiving frequency. This will be explained later in detail.

SUMMARY OF THE INVENTION

It is an object of the present invention to provide an antenna apparatus which can have optimum directivities in relation to a satellite with respect to a transmitting frequency and a receiving frequency that are different from each other.

Another object is to easily be able to optimize the directivities of the antenna apparatus in relation to the satellite with respect to the transmitting frequency and the receiving frequency that are different from each other.

According to the present invention, in an antenna apparatus provided at a mobile station for communication with a satellite, a transmitting antenna element for transmitting a signal, having a certain transmitting frequency, to the satellite is individually provided separate from a receiving antenna element for receiving a signal having a certain receiving frequency from the satellite, the transmitting frequency and the receiving frequency being different from each other. Thus, the directivity of the transmitting antenna element in relation to the satellite can be optimum with respect to the transmitting frequency, and simultaneously, the directivity of receiving antenna element in relation to the satellite can be optimum with respect to the receiving frequency.

Also, a scale and an index are attached to the transmitting antenna element to show the directivity thereof with respect to the transmitting frequency, and a scale and an index are attached to the receiving antenna element to show the directivity thereof with respect to the receiving frequency. Thus, after an optimum directivity of the receiving antenna element in relation to the satellite with respect to the receiving frequency is obtained by monitoring a receiving state thereof, the directivity of the transmitting antenna element is adjusted by making the scale of the transmitting antenna element coincide with that of the receiving antenna element, so that the directivity of the transmitting antenna element to the satellite can be optimized with respect to the transmitting antenna element.

BRIEF DESCRIPTION OF THE DRAWINGS

The present invention will be more clearly understood from the description as set forth below, as compared with the prior art, with reference to the accompanied drawings, wherein.

DESCRIPTION OF THE PREFERRED EMBODIMENT

Before the description of the preferred embodiment, a prior art antenna apparatus will be explained with reference to FIGS. 1 and 2.

Figure 1:
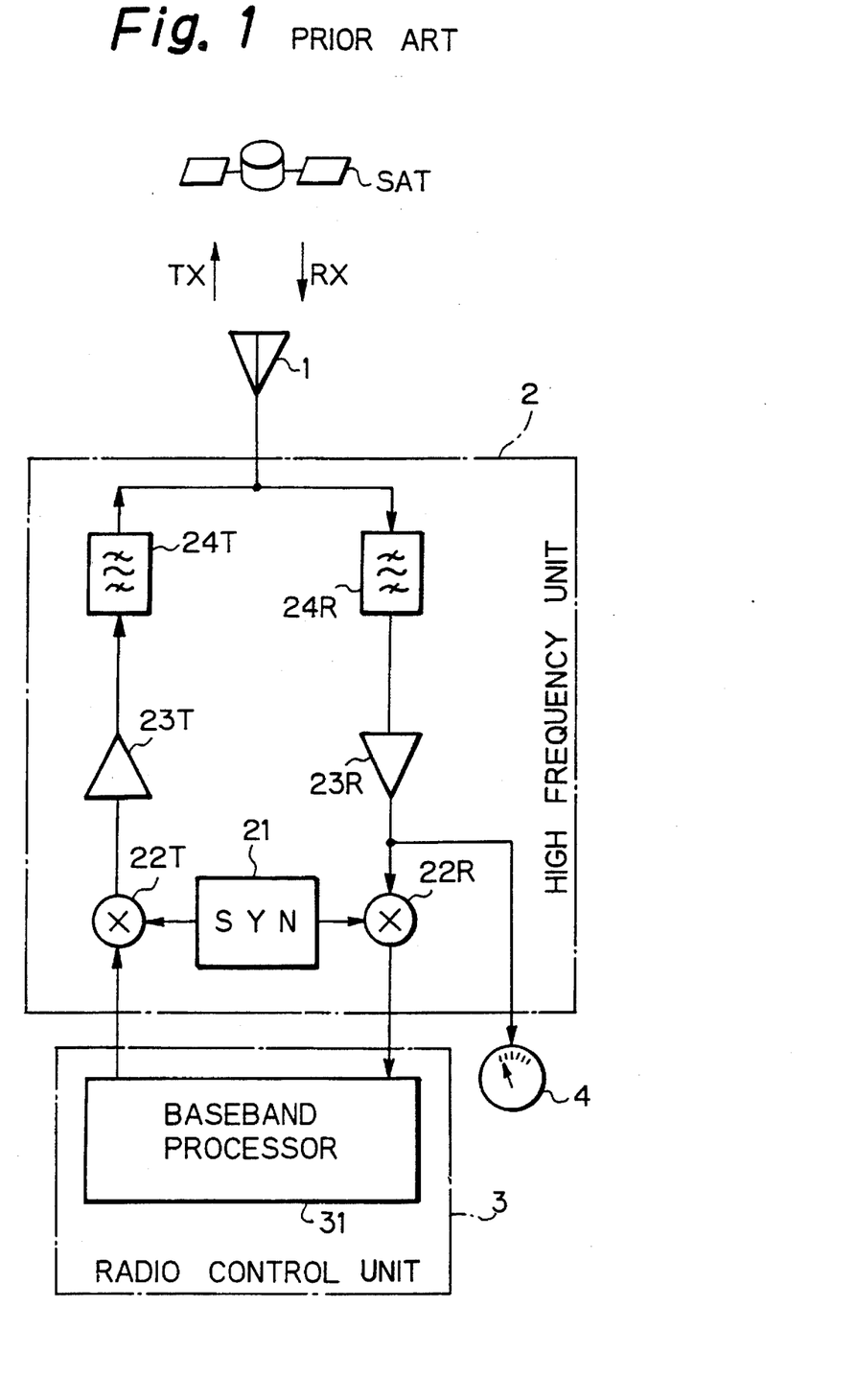
FIG. 1 is a circuit diagram illustrating a prior art antenna apparatus.
Figure 2:
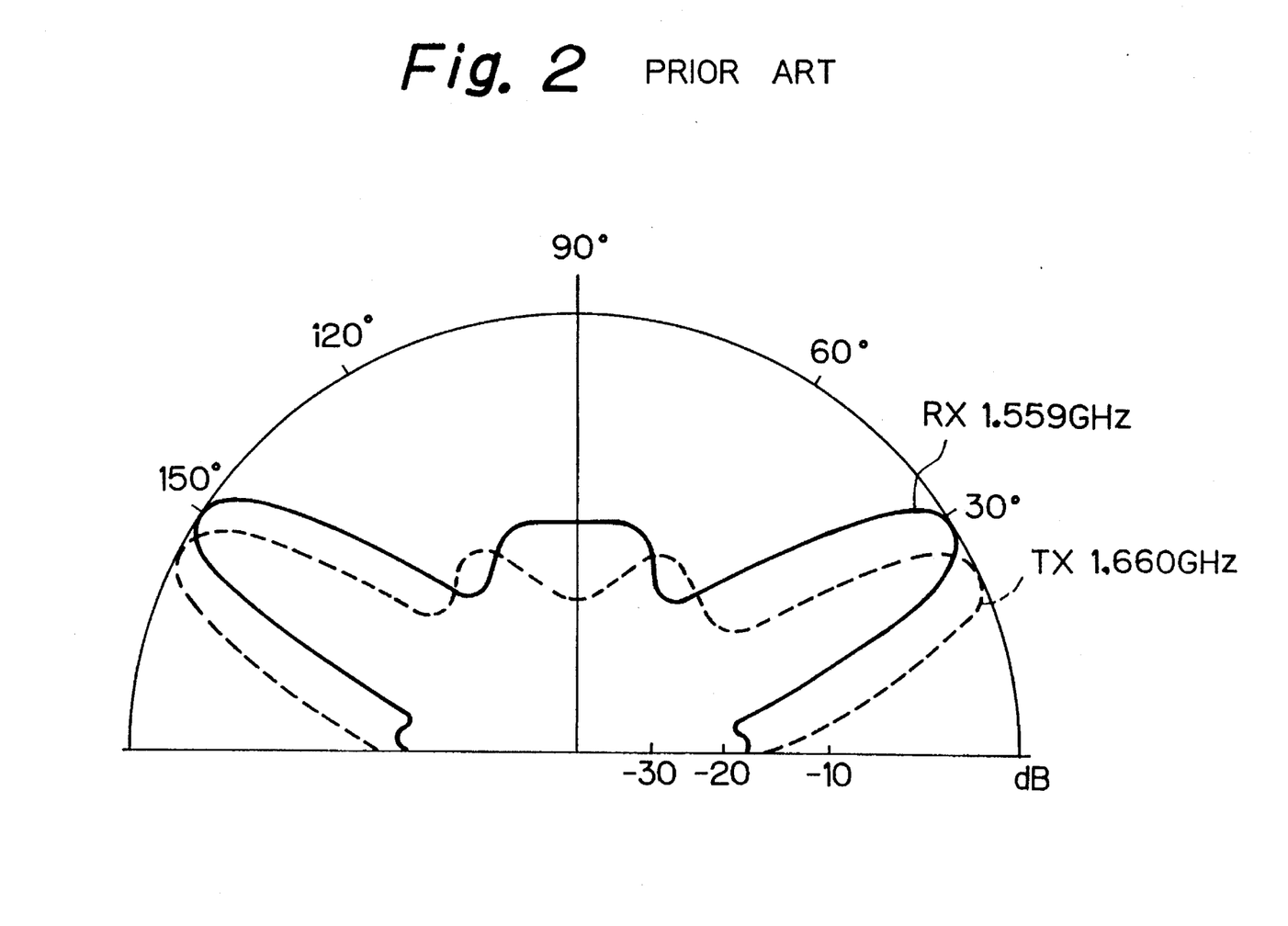
FIG. 2 is a diagram showing a directivity characteristic of the apparatus of FIG. 1.

In FIG. 1, which illustrates a prior art antenna apparatus, the antenna apparatus includes a single antenna element 1 for carrying out communication with a satellite SAT, a high frequency unit 2, a radio control unit 3, and a meter 4 for monitoring a receiving state of the antenna element 1. In more detail, the high frequency unit 2 is comprised of a synthesizer 21, mixers 22T and 22R, a high power amplifier 23T, a low noise amplifier 23R, and band pass filters 24T and 24R. The mixer 22T, the high power amplifier 23T and the band pass filter 24T generate a signal having a transmitting frequency TX, and transmit it via the antenna element 1 to the satellite SAT. On the other hand, the band pass filter 24R, the low noise amplifier 23R and the mixer 22R receive a signal having a receiving frequency RX via the antenna element 1 from the satellite SAT.

Also, the radio control unit 3 is comprised of a baseband processor 31 and the like. Further, the meter 4 is connected to the low noise amplifier 23R.

Generally, as explained above, the transmitting frequency TX is different from the receiving frequency RX. For example, the transmitting frequency TX is 1.660 GHz, and the receiving frequency RX is 1.559 GHz. On the other hand, the directivity of the antenna element 1, such as a helical-type mast antenna, is dependent upon the frequency. For example, the directivity of the antenna element 1 with the transmitting frequency TX (=1.660 GHz) is indicated by a dot line in FIG. 2, and the directivity of the antenna element 1 with respect to the receiving frequency RX (=1.559 GHz) is indicated by a solid line in FIG. 2.

Therefore, in the antenna apparatus of FIG. 1, it is impossible to set the directivity of the antenna element 1 at an optimum angle with respect to both of the transmitting frequency TX and the receiving frequency RX.

Figure 3:
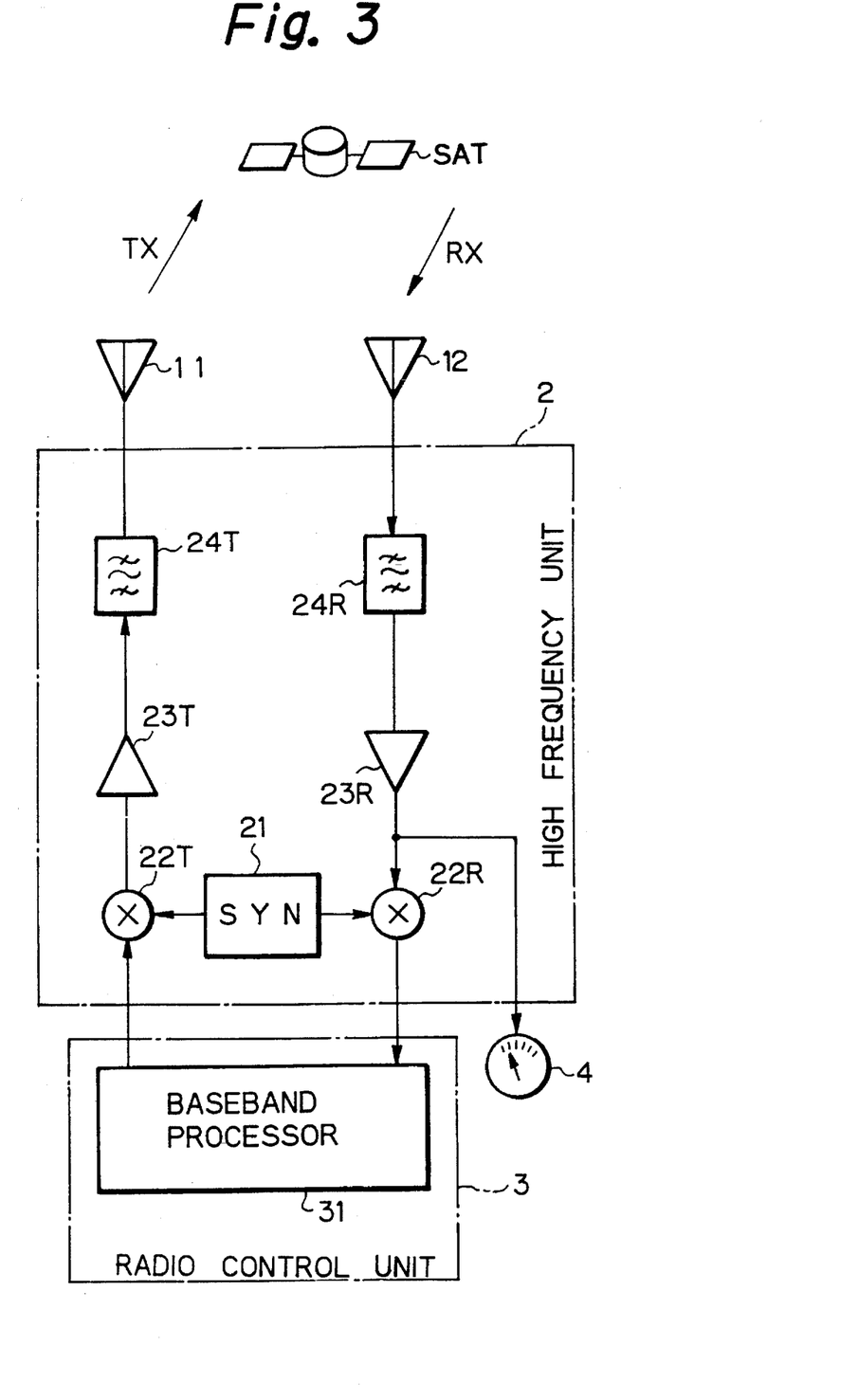
FIG. 3 is a circuit diagram illustrating an embodiment of the antenna apparatus according to the present invention.

In FIG. 3, which illustrates an embodiment of the present invention, a transmitting antenna element 11 for the transmitting frequency TX and a receiving antenna element 12 for the receiving frequency RX are provided instead of the single antenna element 1 of FIG. 1. In FIG. 3, the directivities of the transmitting antenna 11 and the receiving antenna 12 are individually adjusted. That is, the directivity α of the transmitting antenna element 11 can be adjusted at an optimum angle in relation to the satellite SAT with respect to the transmitting frequency TX, and the directivity β of the receiving antenna element 12 can be adjusted at an optimum angle in relation to the satellite SAT with respect to the receiving frequency RX.

The mounting of the antenna apparatus of FIG. 3 will be explained next with reference to FIGS. 4, 5, 6, 7 and 8.

Figure 4:
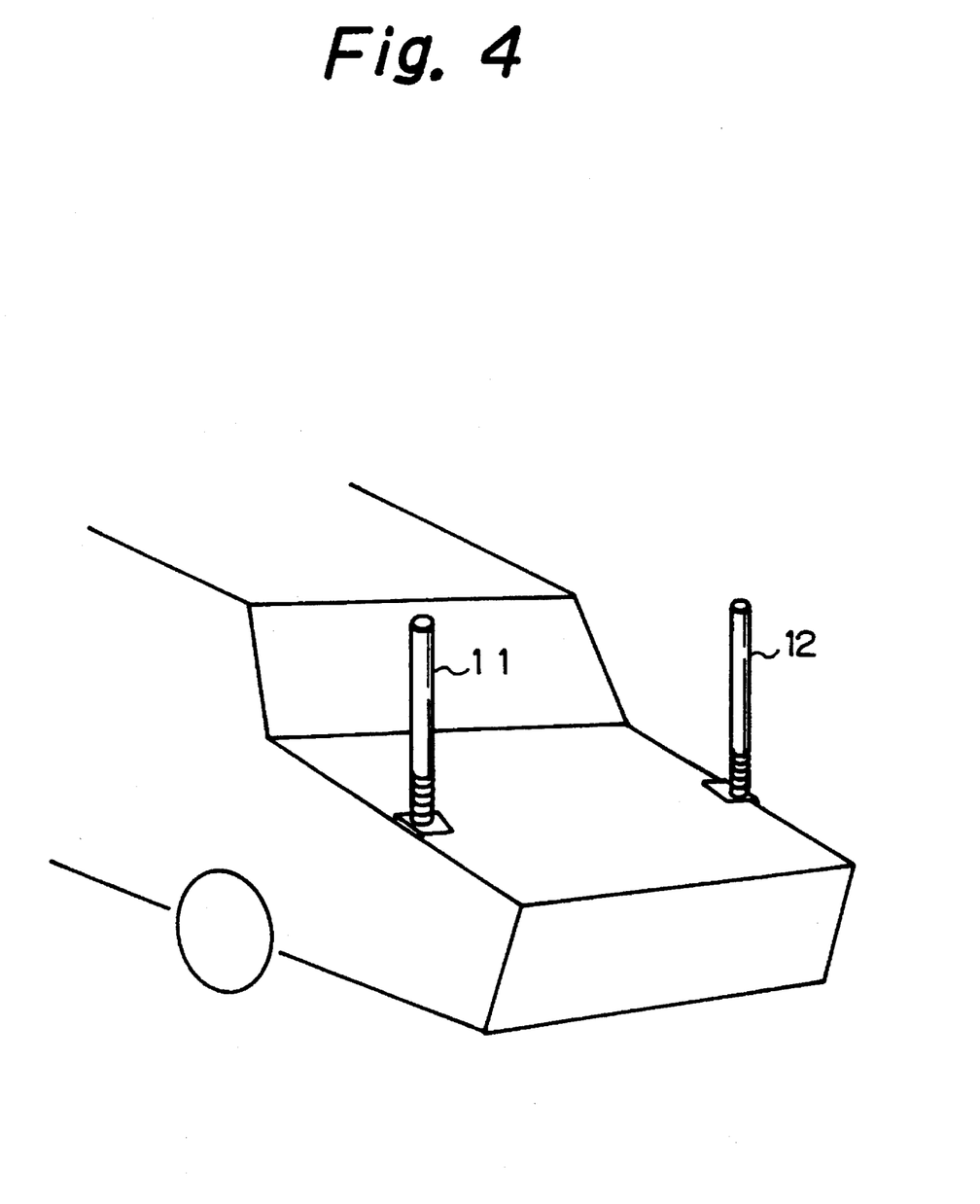
FIG. 4 is a perspective view illustrating an automobile having the apparatus of FIG. 3 mounted thereon.

As illustrated in FIG. 4, the antenna elements 11 and 12 are mounted on rear sides of an automobile. In this case, both of the antenna elements 11 and 12 are perpendicular to the ground.

Figure 5:
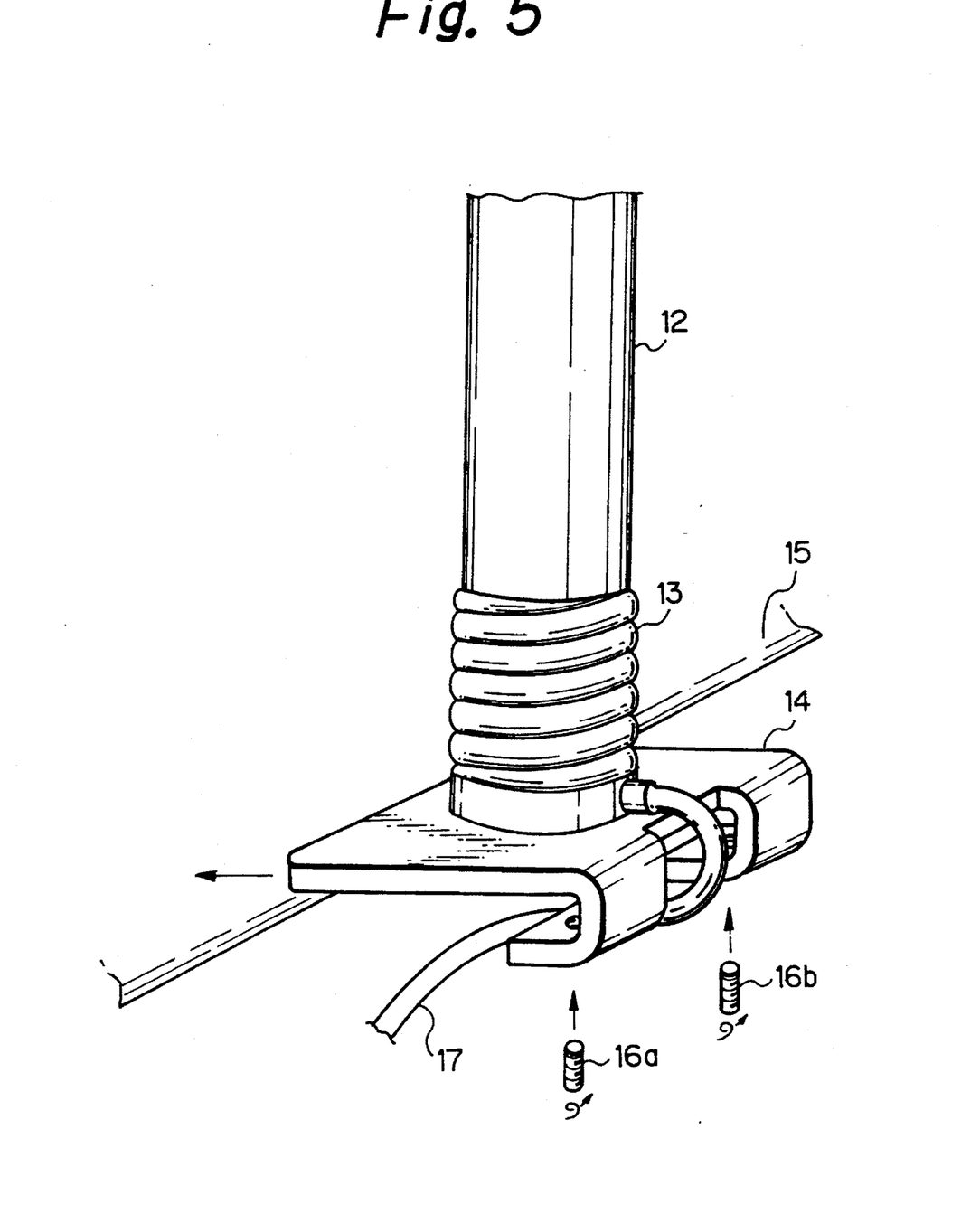
FIG. 5 is a perspective view illustrating a partial enlargement of the antenna element of FIG. 4.

For example, as illustrated in FIG. 5, the bottom end of the antenna element 12 is fixed via a spring 13 to a mounting piece 14. The mounting piece 14 has a bent portion to thereby sandwich a rear cover 15 of the automobile, and therefore, the mounting piece 14 is fixed by screws 16a and 16b to the rear cover 15. As a result, even when the antenna element 12 is sloped by an external force, the antenna element 12 restores its location by a restoring force of the spring 13.

Figure 6:
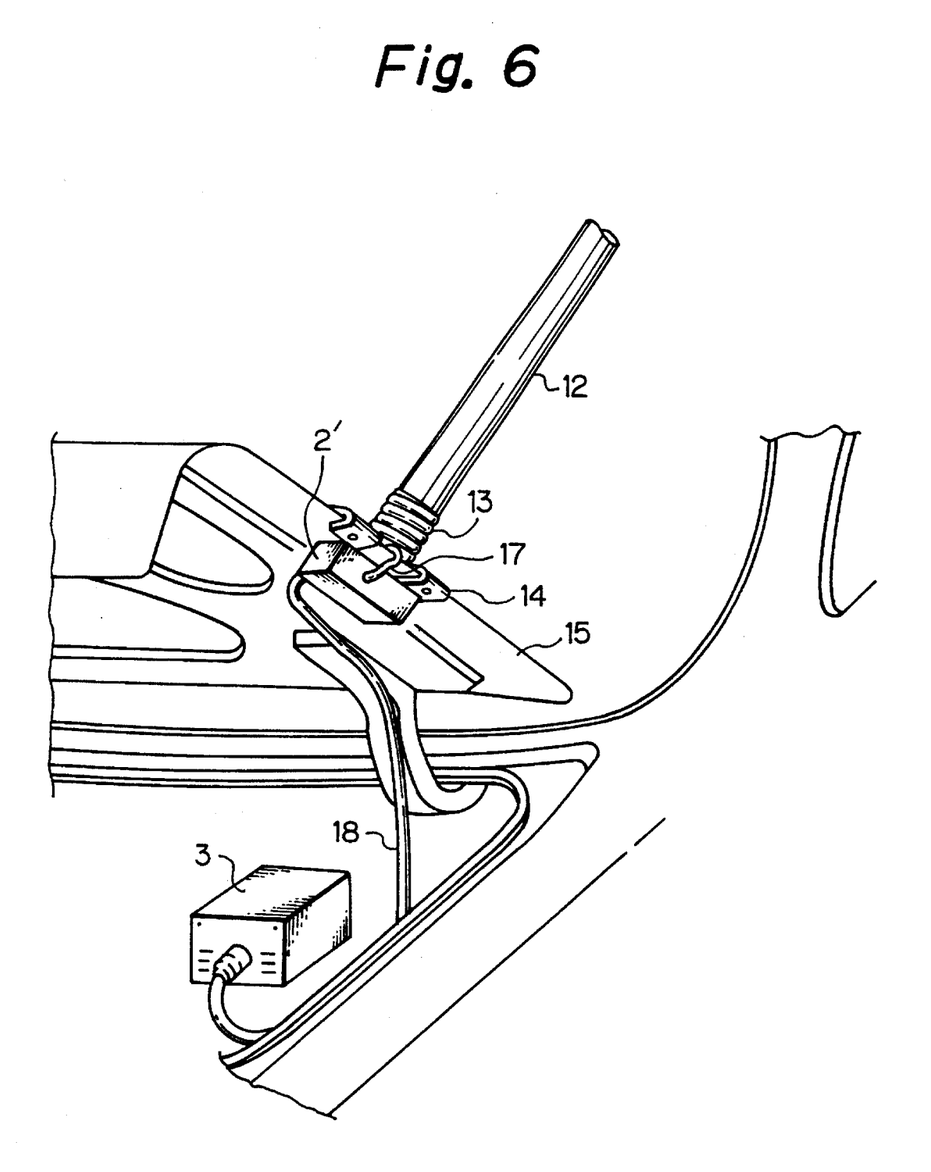
FIG. 6 is a perspective view illustrating an open state of the trunk of FIG. 4.

In FIG. 5, reference numeral 17 designates a cable electrically connected to the antenna element 12. As illustrated in FIG. 6, the cable 17 is connected to a part 2' of the high frequency unit 2 including the bandpass filter 24R and the low noise amplifier 23R, and is further connected via a cable 18 to the radio control unit 3. In this case, the mixer 22R and the synthesizer 21 are provided within the radio control unit 3.

Figure 7:
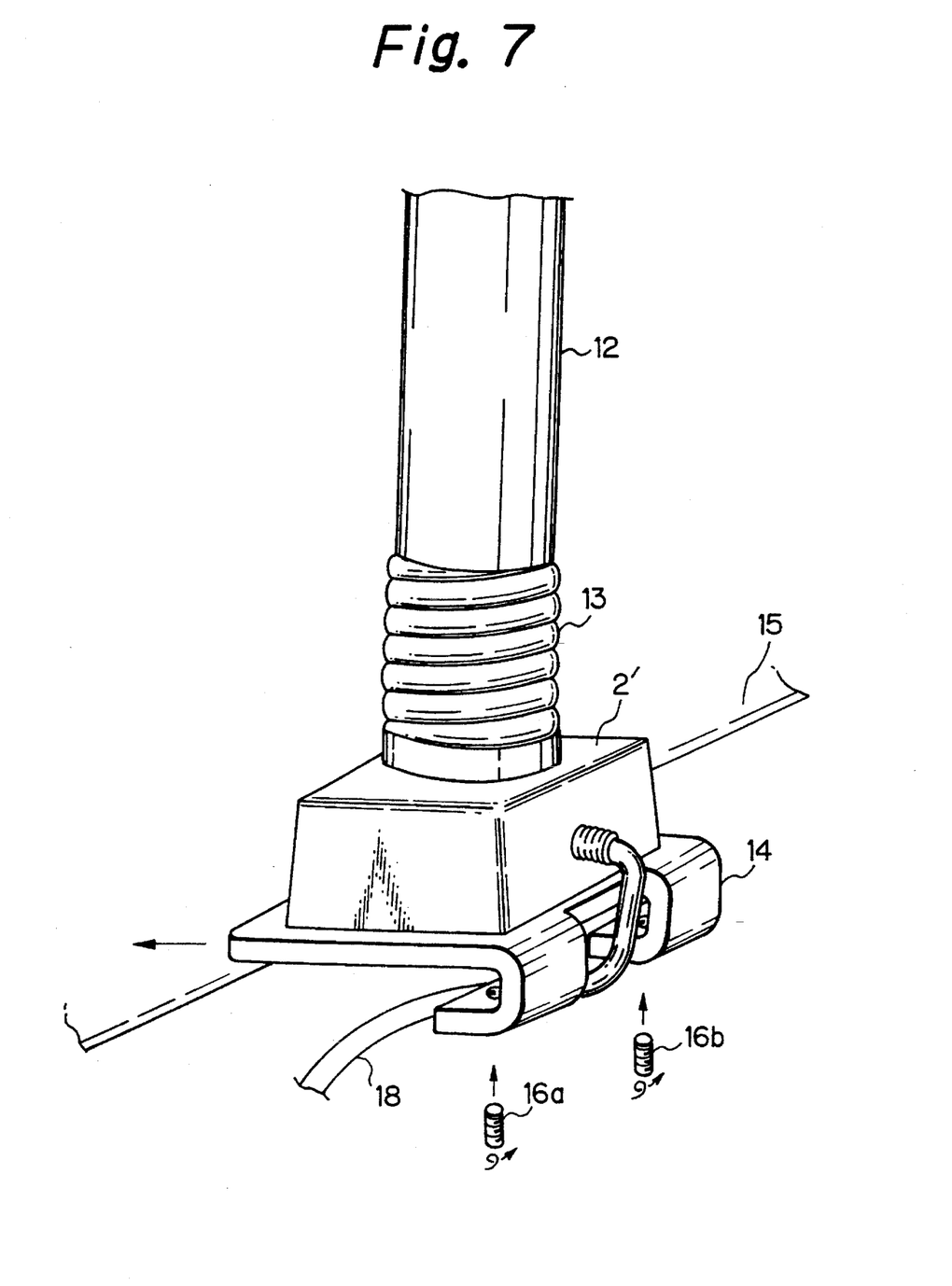
FIG. 7 is a perspective view illustrating a modification of FIG. 5.
Figure 8:
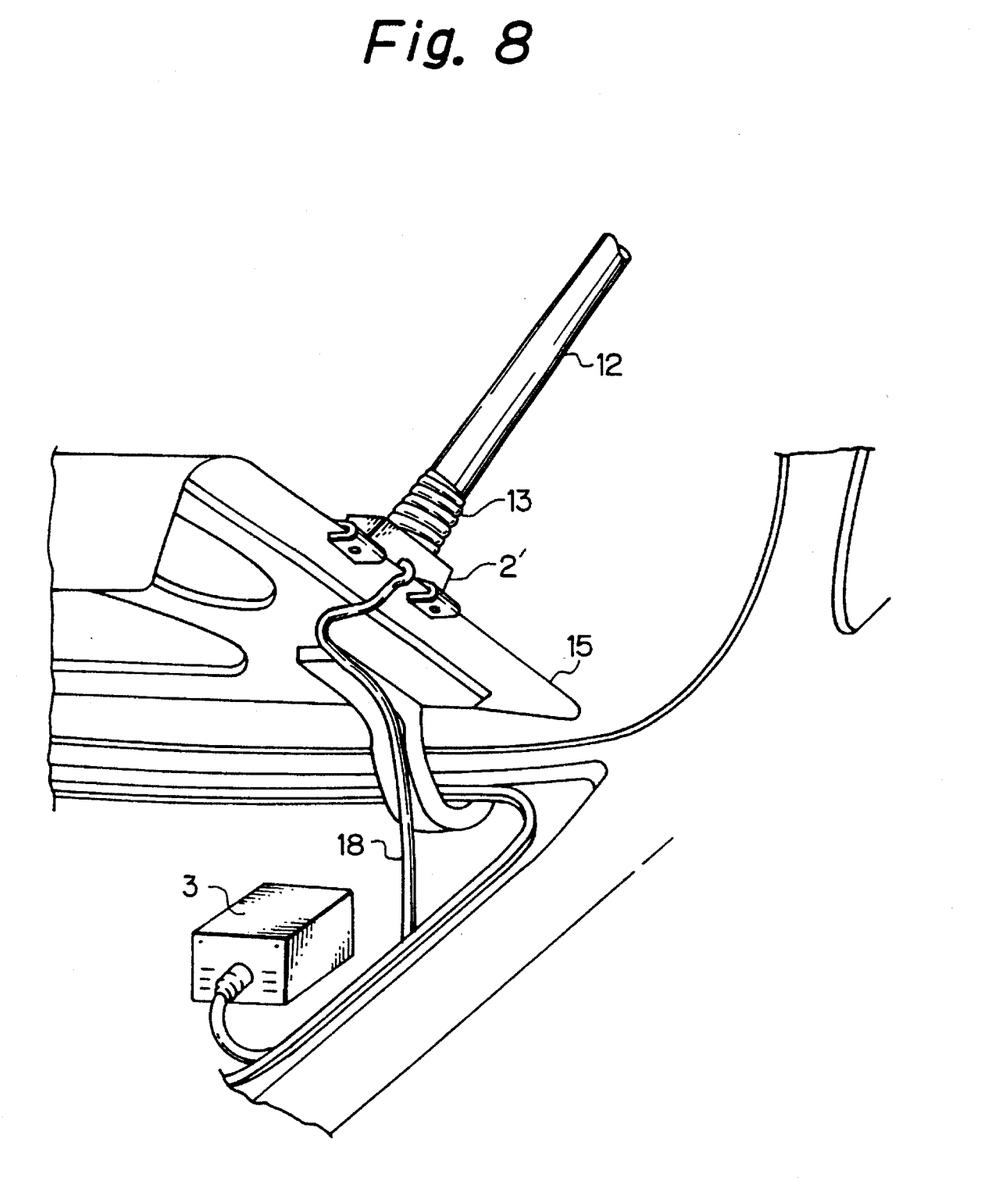
FIG. 8 is a perspective view illustrating a modification of FIG. 6.

In FIG. 7, which illustrates a modification of FIG. 5, the part 2' of the high frequency unit 2 is outside of the rear cover 15. In this case, as illustrated in FIG. 8, the cable 17 of FIGS. 5 and 6 is not present.

Figure 9:
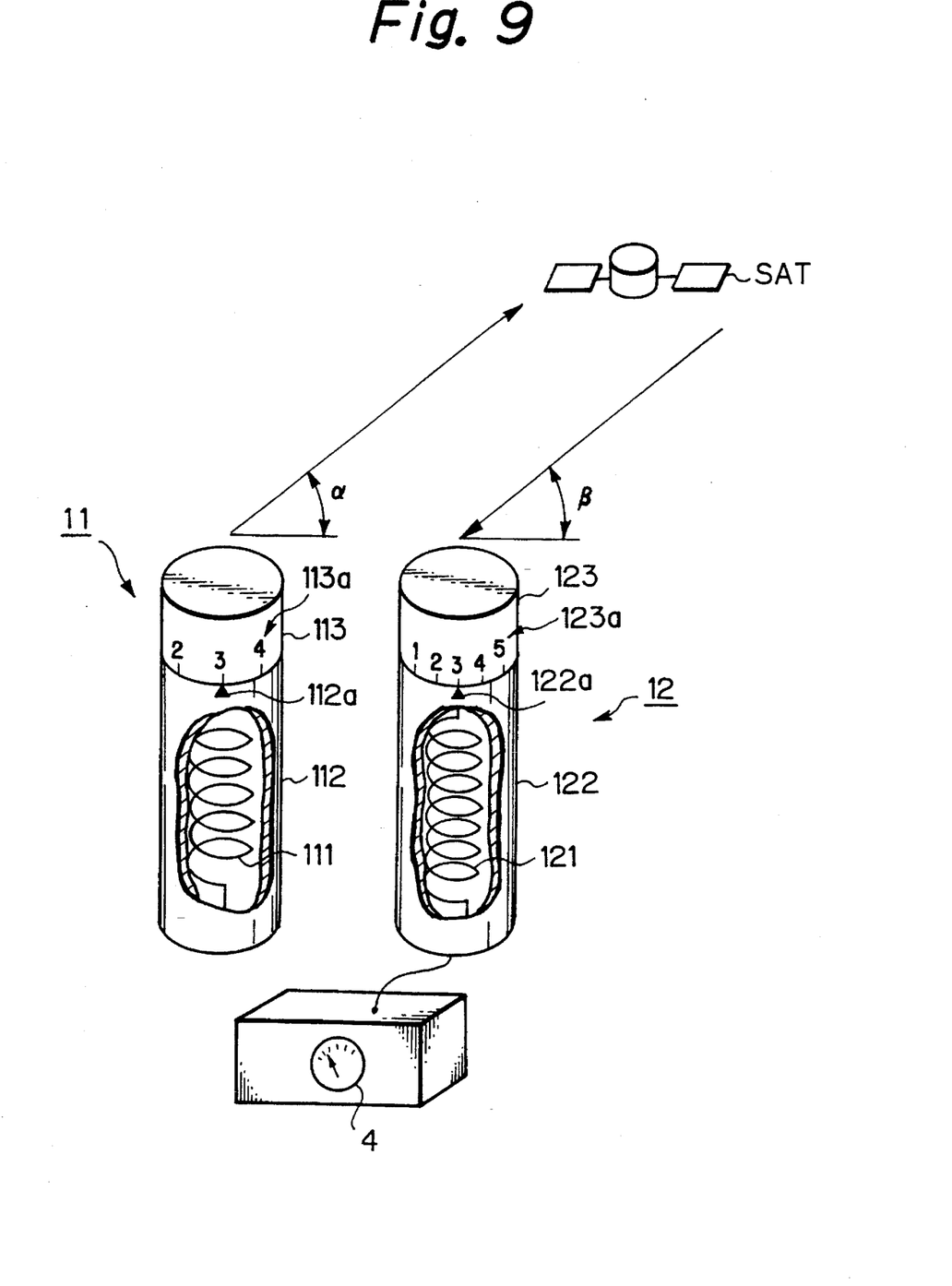
FIG. 9 is a perspective view of the antenna elements of FIG. 3.

In FIG. 9, which illustrates the details of the antenna elements 11 and 12 of FIG. 3, the antenna element 11 (12) is comprised of a helical conductor element 111 (121), a dielectric cylindrical body 112 (122) for encapsulating the helical conductor element 111 (121), and a dielectric rotatable member 113 (123). In this case, the bottom end of the helical conductor element 111 (121) is fixed at the dielectric cylindrical body 112 (122), and the top end of the helical conductor element 111 (121) is fixed at the dielectric rotatable member 113 (123). When the dielectric rotatable member 113 (123) is rotated, the directivity of the antenna element 11 (12) is changed. The amount of rotation of the dielectric rotatable member 113 (123), i.e., the directivity of the antenna element 11 (12) is detected by a scale 113a (123a) attached to the dielectric rotatable member 113 (123) with respect to an index 112a (122a) attached to the dielectric cylindrical body 112 (122).

Figure 10:
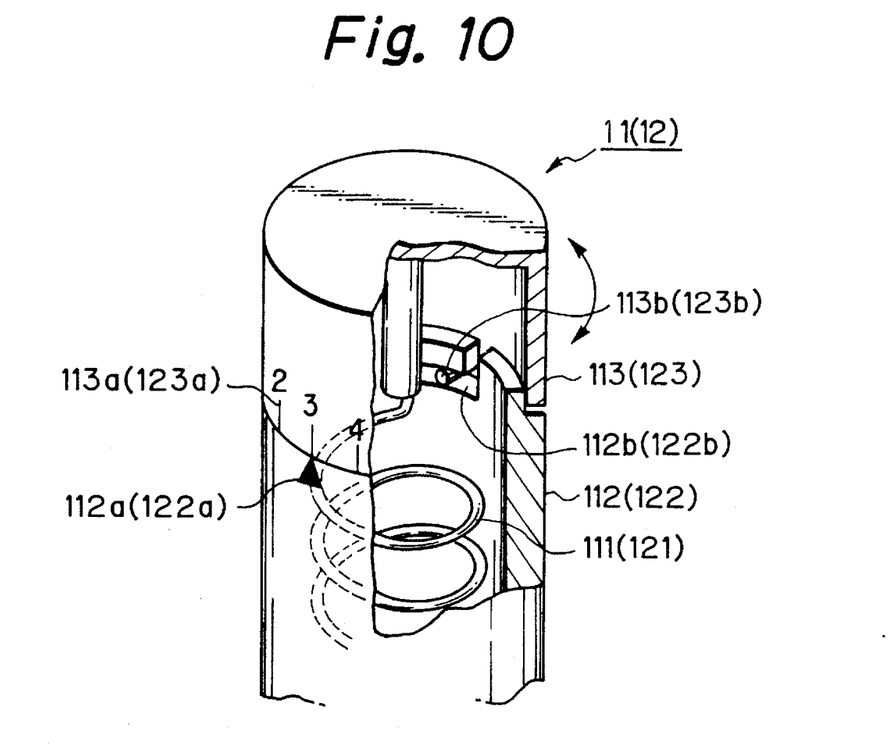
FIG. 10 is a partly cut-away perspective view of the antenna element of FIG. 9.
Figure 11:
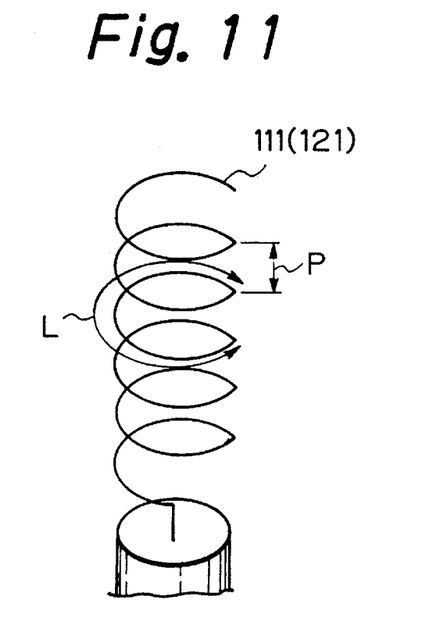
FIG. 11 is a perspective view of the helical conductor element of FIG. 9.

In more detail, as illustrated in FIG. 10, a groove 112b (122b) is formed in the dielectric cylindrical body 112 (122), and a protrusion 113b (123b) is formed on an inner face of the dielectric rotatable member 113 (123). Therefore, the dielectric rotatable member 113 (123) is rotated, the helical conductor element 111 (121) is twisted to change a pitch P of the helical conductor element 111 (121) and a length L per one helix of the helical conductor element 111 (121) as illustrated in FIG. 11.

Figure 12:
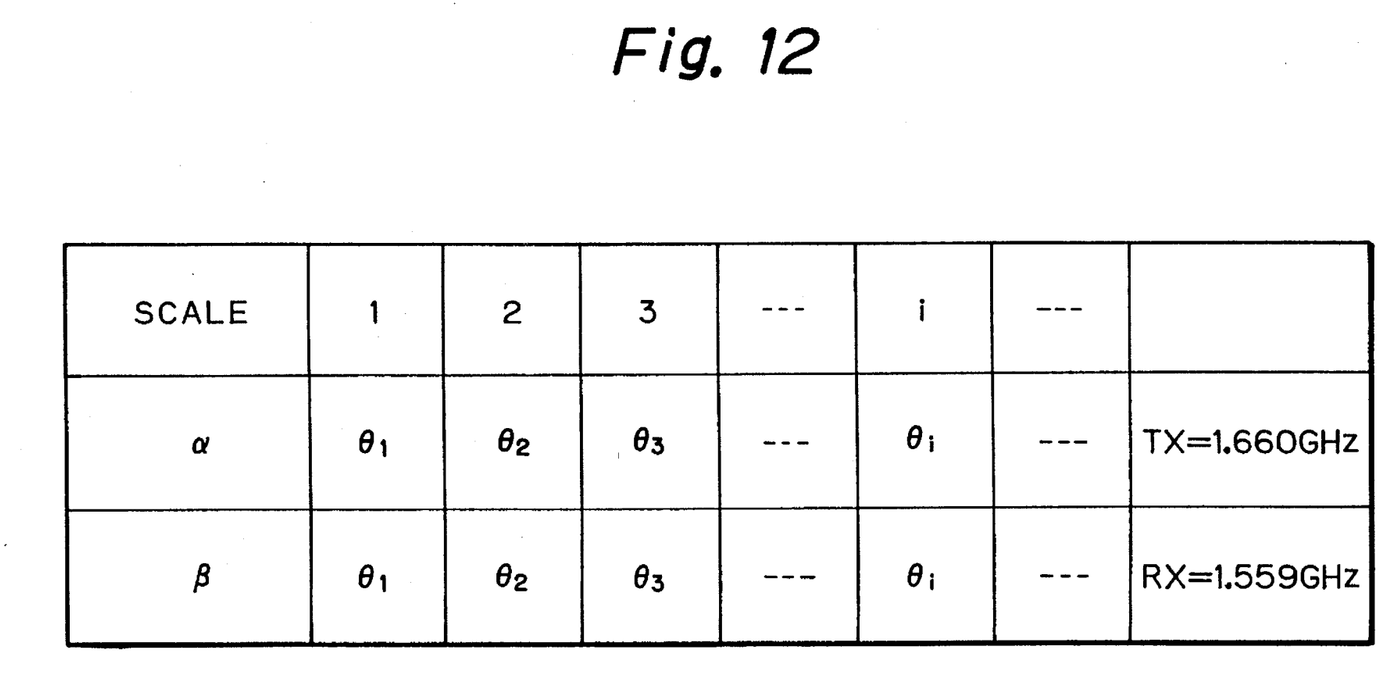
FIG. 12 is a table diagram showing a relationship between the scale and directivities of the antenna elements of FIG. 9.

In the present invention, the scale 113a of the dielectric rotatable member 113 corresponds to the directivity α of the antenna element 11 with respect to the transmitting frequency TX, and the scale 123a of the dielectric rotatable member 123 corresponds to the directivity β of the antenna element 12 with respect to the receiving frequency RX. In other words, as shown in FIG. 12, the directivity α of the antenna element 11 with respect to the transmitting frequency TX is $\theta_1$ and the directivity β of the antenna element 12 with respect to the receiving frequency RX is $\theta_1$ the same symbol "1" is attached to the scale. Similarly, the directivity α of the antenna element 11 with respect to the transmitting frequency TX is $\theta_2$ and the directivity β of the antenna element 12 with respect to the receiving frequency RX is $\theta_2$, the same symbol "2" is attached to the scale. Therefore, the interval of the scale 113a is different from that of the scale 123a.

The adjusting operation of the directivities of the antenna elements 11 and 12 is explained below.

First, the directric rotatable member 123 is rotated to obtain a maximum gain from the meter 4 which is provided at a suitable location for an operator. As a result, an optimum directivity of the antenna element 12 with respect to the receiving frequency RX is obtained. In this state, assume that the scale 123a indicated by the index 122a shows "i", and accordingly, the optimum directivity β of the antenna element 12 with respect to the receiving frequency RX is $\theta_i$. Then, the operator rotates the dielectric rotatable member 113 until the scale 113a indicated by the index 112a shows "i". As a result, the directivity α of the antenna element 11 with respect to the transmitting frequency TX is also an optimum angle which is, in this case, $\theta_i$.

Thus, both of the directivities of the antenna elements 11 and 12 can be optimized.

As explained hereinbefore, according to the present invention, optimum directivities of an antenna apparatus to a satellite can be obtained with respect to a transmitting frequency and a receiving frequency which are different from each other. Also, adjustment of the antenna apparatus in relation to the satellite with respect to the transmitting and receiving frequencies is easy.

I claim:

1. An antenna apparatus, provided at a mobile station for communication with a satellite, comprising:

a transmitting antenna element for transmitting a signal having a transmitting frequency to said satellite; and a receiving antenna element for receiving a signal having a receiving frequency from said satellite, the receiving frequency being different from the transmitting frequency;

said transmitting antenna element and said receiving antenna element each including a helical antenna element having a helical conductor element;

a dielectric cylindrical body for encapsulating said helical conductor element, an end of said helical conductor element being fixed to said dielectric cylindrical body; and a dielectric rotatable member rotatably mounted on said dielectric cylindrical body, the other end of said helical conductor element being fixed at said dielectric rotatable member, wherein rotation of said dielectric rotatable member changes a helical pitch of said helical conductor element thereby changing directivity of said helical antenna element.

2. An apparatus as set forth in claim 1, further comprising:

a first adjusting means for adjusting a directivity of said transmitting antenna element with respect to the transmitting frequency; and a second adjusting means for adjusting a directivity of said receiving antenna element with respect to the receiving frequency.

3. An apparatus as set forth in claim 2, wherein said first adjusting means having a first scale on said dielectric rotatable member of said transmitting antenna element showing the directivity of said transmitting antenna element with respect to the transmitting frequency, said second adjusting means having a second scale on said dielectric rotatable member of said receiving antenna element showing the directivity of said receiving antenna element with respect to the receiving frequency.

4. An apparatus as set forth in claim 1, wherein a first scale showing a directivity of said transmitting antenna element with respect to the transmitting frequency is attached to said dielectric rotatable member of said transmitting antenna element, and a first index is attached to said dielectric cylindrical body of said transmitting antenna element, and wherein a second scale showing a directivity of said receiving antenna element with respect to the receiving frequency is attached to said dielectric rotatable member of said receiving antenna element, and a second index is attached to said dielectric cylindrical body of said receiving antenna element.

5. An apparatus as set forth in claim 1, further comprising:

a first high frequency unit connected to said transmitting antenna element;

a second high frequency unit connected to said receiving antenna element;

a radio control unit connected to said first and second high frequency units; and a meter connected to said second high frequency unit; for showing a receiving state of said receiving antenna element.

6. An apparatus as set forth in claim 5, wherein said mobile station is an automobile, said first transmitting antenna element, said receiving antenna element and said meter being provided at the outside of the automobile, said first and second high frequency units and said radio unit being provided inside of said automobile.

7. An apparatus as set forth in claim 5, wherein said mobile station is an automobile, said first transmitting antenna element, said receiving antenna element and said first and second high frequency units being provided at the outside of said automobile, said radio unit being provided inside of said automobile.

* * * * *